(12) United States Patent
Sagayaraj et al.

(10) Patent No.: US 9,060,107 B2
(45) Date of Patent: Jun. 16, 2015

(54) VIDEO RESPONSES TO MESSAGES

(75) Inventors: Maria Sagayaraj, Chennai (IN); Narayanadhoss Gopalakrishnan, Chennai (IN); Ganesh Ramasamy, Chennai (IN); Ramprasath Hariharan, Chennai (IN); Sundar Sivaraman, Tirunelveli (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 313 days.

(21) Appl. No.: 13/303,936

(22) Filed: Nov. 23, 2011

(65) Prior Publication Data

US 2013/0128058 A1    May 23, 2013

(51) Int. Cl.
*H04N 5/225* (2006.01)
*H04N 21/4786* (2011.01)
*H04L 12/58* (2006.01)

(52) U.S. Cl.
CPC .............. *H04N 5/225* (2013.01); *H04L 12/58* (2013.01); *H04N 21/4786* (2013.01)

(58) Field of Classification Search
CPC ............. H04L 12/58; H04L 12/581–12/5895; H04L 29/1215; H04L 51/18; G06Q 10/10; H04N 21/4786; H04N 21/4788

USPC ........................................ 348/207.1; 715/752
See application file for complete search history.

(56) References Cited

U.S. PATENT DOCUMENTS

| | | | |
|---|---|---|---|
| 5,841,966 A * | 11/1998 | Irribarren | 709/206 |
| 6,032,126 A * | 2/2000 | Kaehler | 705/16 |
| 6,223,213 B1 * | 4/2001 | Cleron et al. | 709/206 |
| 6,522,333 B1 * | 2/2003 | Hatlelid et al. | 345/474 |
| 6,906,741 B2 * | 6/2005 | Canova et al. | 348/14.08 |
| 7,139,014 B1 * | 11/2006 | Kim et al. | 348/14.01 |
| 7,451,189 B1 * | 11/2008 | DeLaCruz | 709/206 |
| 7,774,422 B2 * | 8/2010 | DeLaCruz | 709/206 |
| 2001/0004743 A1 * | 6/2001 | Krueger et al. | 709/206 |
| 2002/0056123 A1 * | 5/2002 | Liwerant et al. | 725/87 |
| 2002/0143881 A1 * | 10/2002 | DeLaCruz | 709/206 |
| 2005/0164696 A1 * | 7/2005 | Balley et al. | 455/420 |
| 2006/0215011 A1 * | 9/2006 | P. S. et al. | 348/14.02 |
| 2007/0150842 A1 * | 6/2007 | Chaudhri et al. | 715/863 |
| 2008/0122796 A1 * | 5/2008 | Jobs et al. | 345/173 |
| 2010/0009700 A1 * | 1/2010 | Camp et al. | 455/456.6 |
| 2011/0047368 A1 * | 2/2011 | Sundaramurthy et al. | 713/100 |

\* cited by examiner

*Primary Examiner* — Timothy J Henn
*Assistant Examiner* — Pritham Prabhakher

(57) ABSTRACT

A device may receive a message from another device. The message may include a request to capture a reaction of a user when the message is displayed. The device may further cause the received message to be displayed, and cause, based on the request, at least one of a video, a picture, or an audio of the user to be captured while the received message is being displayed.

20 Claims, 12 Drawing Sheets

VIDEO RESPONSES TO MESSAGES

BACKGROUND

In an increasingly networked world, more and more communications are conducted using non-voice technologies. For example, emailing, texting, and instant messaging are common methods of communicating.

DETAILED DESCRIPTION OF PREFERRED EMBODIMENTS

The following detailed description refers to the accompanying drawings. The same reference numbers in different drawings may identify the same or similar elements.

Techniques described herein may relate to recording a user's reaction to receiving a message, such as an email. For example, implementations described herein may allow a user to configure an email account to request that a video be recorded to capture the recipient's reaction to reading an email, sent from the user. Thus, upon receipt of the email, the recipient may be notified that the user has requested that the recipient's reaction be recorded and sent to the user. If the recipient permits the recording, the recipient's device may automatically record a video, as the recipient reads the email, and return the video to the user. In this way, the user may see the recipient's reaction as the recipient reads the email.

A video response, as broadly used herein, may refer to the capturing of video, a picture, and/or audio. Thus, the use of the phrase "video response" herein does not require that video actually be captured.

Figure 1:
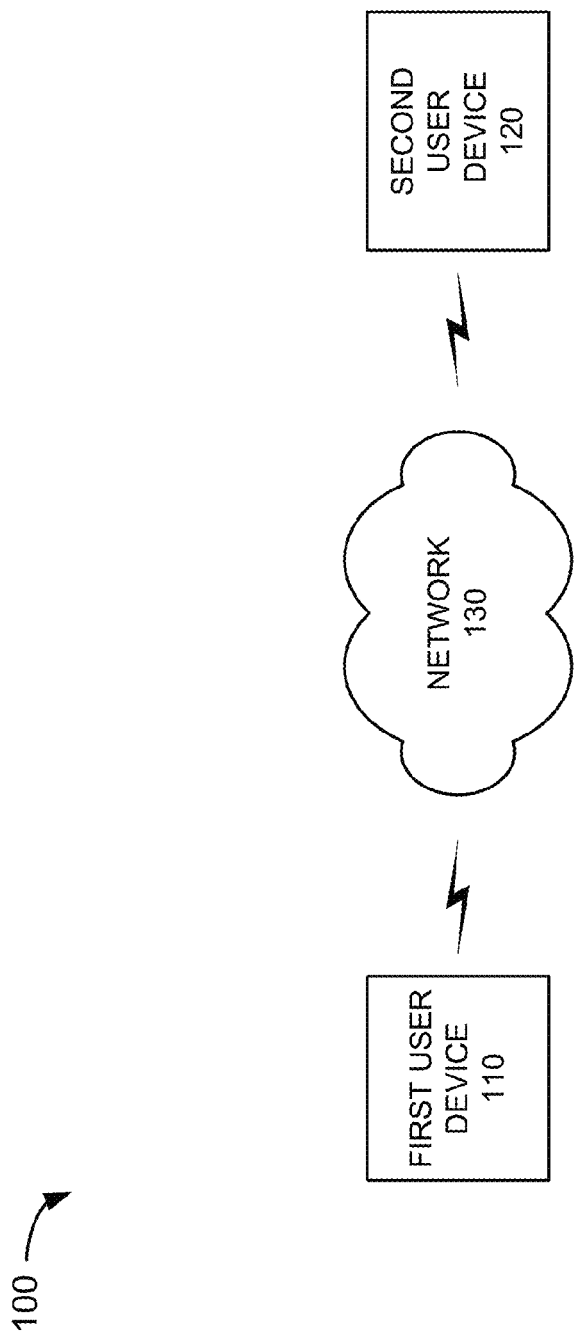
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a first user device 110, a second user device 120, and a network 130. Devices of environment 100 may interconnect via wired connections, wireless connections, or a combination of wired and wireless connections.

First user device 110 and second user device 120 may include devices that can send and receive messages. For example, first user device 110 and second user device 120 may include a smart phone, a personal digital assistant (PDA) (e.g., that can include a radiotelephone, a pager, Internet/intranet access, etc.), a personal computer, a laptop computer, a tablet computer, a camera, a personal gaming system, or another type of communication device.

Network 130 may include one or more wired and/or wireless networks. For example, network 130 may include a cellular network and/or another type of wireless network. Additionally, or alternatively, network 130 may include a wide area network (WAN), a metropolitan network (MAN), an ad hoc network, an intranet, the Internet, a fiber optic-based network (e.g., a FiOS network), and/or a combination of these or other types of networks.

Although FIG. 1 shows example components of environment 100, in other implementations, environment 100 may include additional devices and/or networks, different devices and/or networks, and/or differently arranged devices and/or networks than those depicted in FIG. 1. Additionally, or alternatively, one or more components of environment 100 may perform one or more tasks described as being performed by one or more other components of environment 100.

Figure 2:
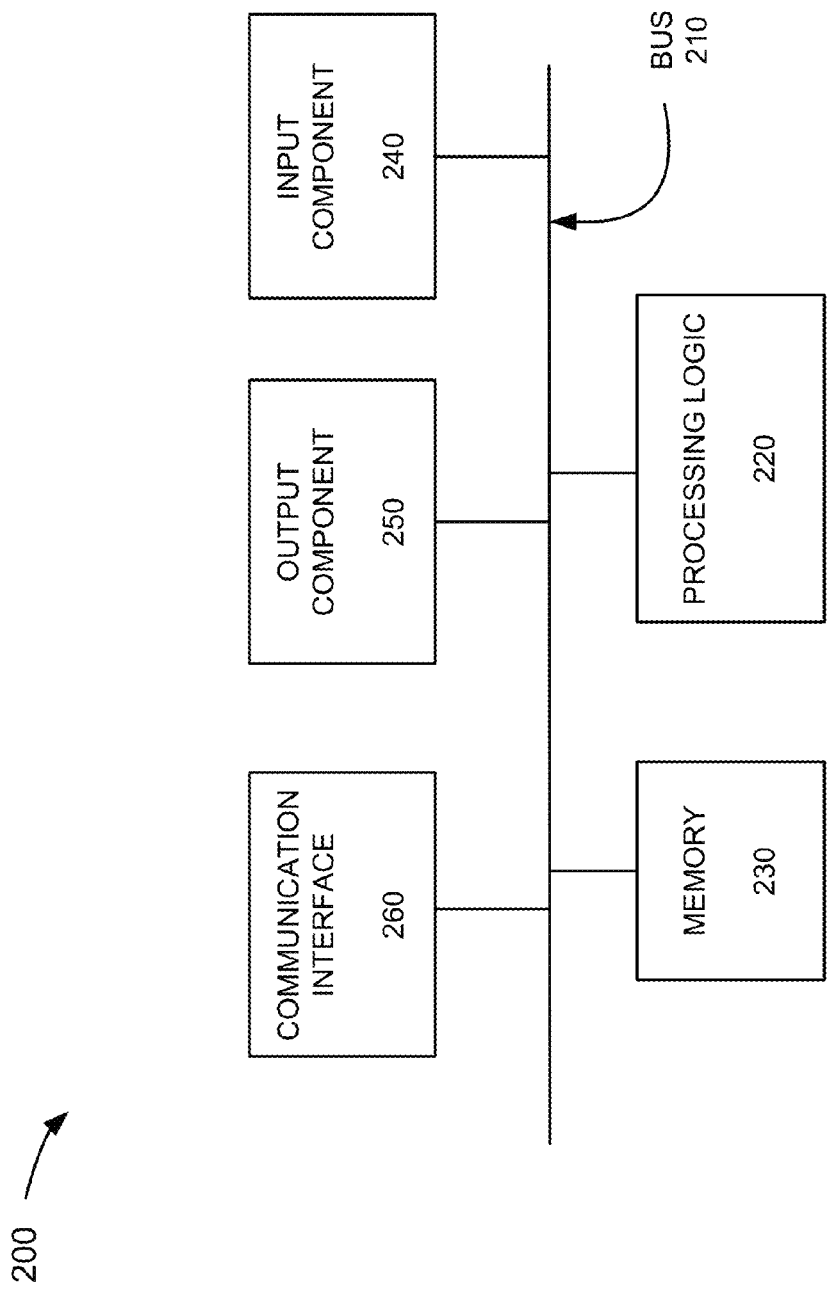
FIG. 2 depicts a diagram of example components of the user device of FIG. 1.

FIG. 2 depicts a diagram of example components of a device 200. Device 200 may correspond to first user device 110 and/or second user device 120. Alternatively, first user device 110 and/or second user device 120 may include more than one device 200. As shown in FIG. 2, device 200 may include a bus 210, processing logic 220, a memory 230, an input component 240, an output component 250, and a communication interface 260.

Bus 210 may permit communication among the other components of device 200. For example, bus 210 may include a system bus, an address bus, a data bus, and/or a control bus. Bus 210 may also include bus drivers, bus arbiters, bus interfaces, and/or clocks.

Processing logic 220 may interpret and/or execute instructions. For example, processing logic 220 may include one or more general-purpose processors, microprocessors, data processors, graphical processing units (GPUs), co-processors, network processors, application specific integrated circuits (ASICs), application specific instruction-set processors (ASIPs), system-on-chips (SOCs), controllers, programmable logic devices (PLDs), chipsets, and/or field programmable gate arrays (FPGAs).

Memory 230 may store data and/or instructions related to the operation and use of device 200. For example, memory 230 may store data and/or instructions that may be configured to implement one or more implementations described herein. Memory 230 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. Memory 230 may further include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 240 may permit a user and/or another device to input information into device 200. For example, input component 240 may include a keyboard, a keypad, a mouse, a display (e.g., a touch screen), a camera, a button, a switch, a microphone, voice recognition logic, and/or some other type of input component. Output component 250 may permit device 200 to output information to the user and/or another device. For example, output component 250 may include a display, a speaker, one or more light emitting diodes (LEDs), an output port, and/or some other type of output component.

Communication interface 260 may permit device 200 to communicate with other devices, networks, and/or systems. Communication interface 260 may include a transceiver-like component. For example, communication interface 260 may include an Ethernet interface, an optical interface, a coaxial interface, a radio interface (including one or more antennas), and/or some other type of wired and/or wireless interface.

As will be described in detail below, device 200 may perform certain operations relating to implementations described herein. Device 200 may perform these and other operations in response to processing logic 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, additional components, different components, and/or a different arrangement of components than those depicted in FIG. 2. Additionally, or alternatively, one or more components of device 200 may perform one or more tasks described as being performed by one or more other components of device 200.

Figure 3:
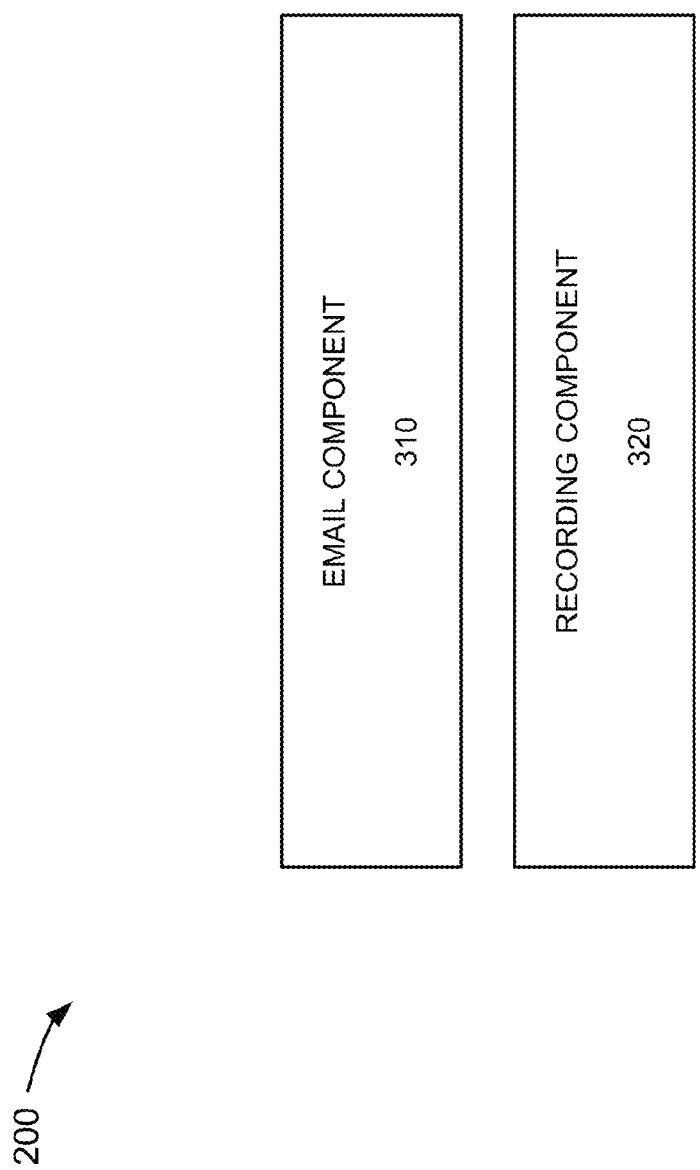
FIG. 3 is a diagram illustrating example functional components that may be associated with a user device of FIG. 1.

FIG. 3 is a diagram illustrating example functional components that may be associated with device 200. The functional components of FIG. 3 may be implemented via one or more of the components of FIG. 2. For example, the functional components of FIG. 3 may be implemented via processing logic 220 executing instructions stored in memory 230. As shown, device 200 may include an email component 310 and a recording component 320.

Email component 310 may include one or more components that provide one or more interfaces to a user, of device 200, to allow the user to create emails, send and receive emails, and configure device 200 to create, send, and/or receive emails. For example, email component 310 may provide an interface that allows the user to specify parameters relating to sending emails, receiving emails, formatting emails, saving emails, etc. As described herein, email component 310 may provide an interface that allows the user to specify parameters relating to capturing a video response in connection with a particular email. An example interface that may be provided, by email component 310, is described below in connection with FIG. 5.

Recording component 320 may include one or more components that allow device 200 to record a video of a user. As described herein, recording component 320 may capture, with permission of the user, the user's reaction as the user opens and reads an email. The reaction may be captured as a video file, an image file, and/or an audio file. Recording component 320 may record the user's reaction based on parameters associated with the received email.

Although FIG. 3 shows example functional components of device 200, in other implementations, device 200 may include fewer functional components, different functional components, or additional functional components than depicted in FIG. 3. Additionally, or alternatively, one or more functional components of device 200 may perform one or more tasks described as being performed by one or more other functional components of device 200.

Figure 4:
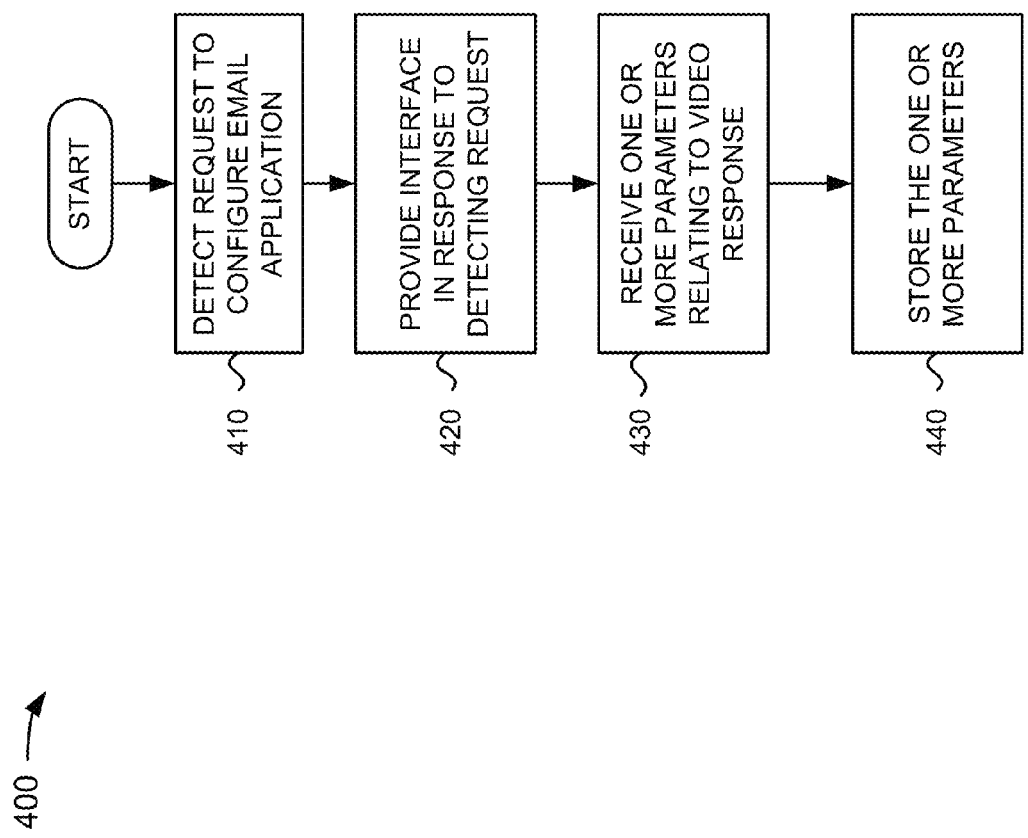
FIG. 4 is a flow chart illustrating an example process for configuring the first user device for sending an email with a video response request.

FIG. 4 is a flow chart illustrating an example process 400 for configuring first user device 110 for sending an email with a video response request. Process 400 may be performed, for example, by first user device 110. In other implementations, some or all of process 400 may be performed by another device or group of devices, including or excluding first user device 110.

Process 400 may include detecting a request to configure an email application (block 410). For example, a user, of first user device 110, may initiate an email application, stored on first user device 110. The user may then request to configure the email application by, for example, selecting a menu item, selecting a button, or in another way. First user device 110 (e.g. email component 310) may detect the request to configure the email application.

Process 400 may further include providing an interface in response to detecting the request (block 420). For example, email component 310 may, in response to detecting the request to configure the email application, provide an interface to allow the user to specify parameters relating to creating emails, sending and/or receiving emails, formatting emails, etc. In one implementation, the interface may allow the user to specify parameters relating to capturing a video response in connection with an email.

Figure 5:
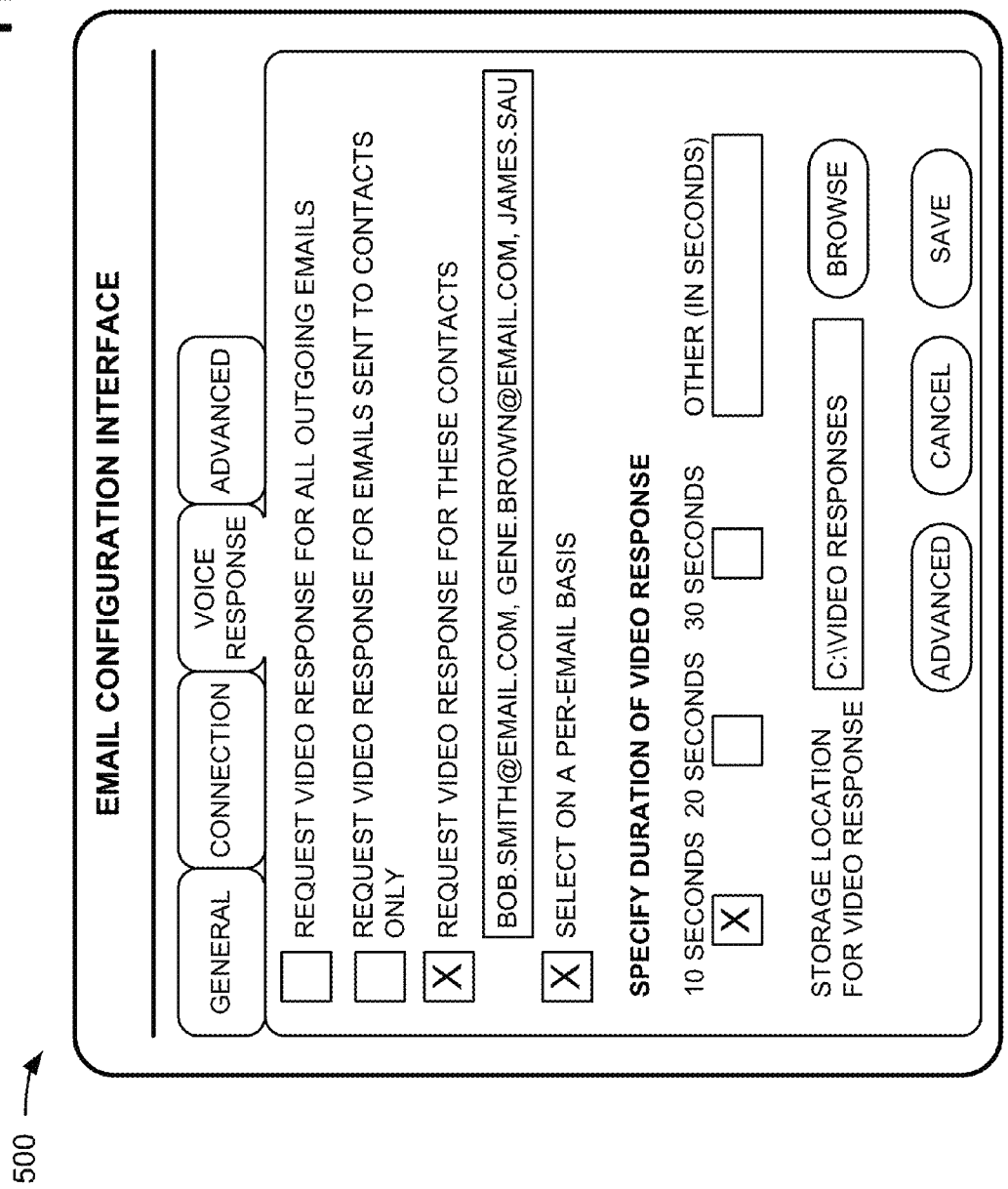
FIG. 5 is a diagram illustrating an example interface that may be provided to a user of the first user device.

FIG. 5 is a diagram of an example interface 500 that may be provided to the user. As shown, interface 500 may include a group of fields that relate to obtaining a video response. For example, interface 500 may include one or more fields relating to when video responses are to be requested from email recipients. As one example, interface 500 may allow the user to specify that a video response is to be requested for all outgoing emails, that a video response is to be requested only for emails sent to contacts, of the user, that are stored in a contacts folder of the user, that a video response is to be requested only for specified email addresses, and/or that an option to request a video response should be provided on a per-email basis.

Interface 500 may further include fields relating to a duration of time that a video response should be recorded. For example, interface 500 may allow a user to specify that 10 seconds of video, 20 seconds of video, 30 seconds of video, or some other duration of video is to be recorded. Interface 500 may further include a field that allows the user to specify a location where the video response is to be saved, once the video response is received from the email recipient.

Although FIG. 5 shows example fields that may be provided, in other implementations, interface 500 may include fewer fields, different fields, or additional fields than those depicted in FIG. 5. For example, interface 500 may include (or provide in response to selection of the ADVANCED button) a field that allows the user to specify when recording of the video response is to begin. As one example, interface 500 may include a field that allows the user to specify that the capturing of the video response is to begin after a particular duration of time following when the email recipient opens the email. Additionally, or alternatively, interface 500 may include a field that allows the user to specify that the capturing of the video response is to begin after an event, such as an action by the email recipient. The action may include the email recipient interacting with the email in a particular manner, the email recipient focusing his/her gaze on the email, and/or another type of action.

Additionally, or alternatively, interface 500 may include a field that allows the user to specify where the video response is to be sent. For example, although the email requesting the video response is sent from a first email address, interface 500 may include a field that allows the user to specify that the video response is to be sent to a second, different email address or a group of email addresses.

Additionally, or alternatively, interface 500 may include a field that allows the user to specify that the recipient's reaction, to the email, is to be captured in some format, other than video. For example, interface 500 may include a field that allows the user to specify that a picture of the email recipient is to be captured instead of a video. In this situation, interface 500 may include a field that allows the user to specify a quantity of pictures to be captured, an interval at which the pictures are to be captured, events that trigger the capturing of pictures, etc. Additionally, or alternatively, interface 500 may include a field that allows the user to specify that audio is to be captured instead of video. In this situation, interface 500 may include a field that allows the user to specify a duration of audio that is to be captured, an event that triggers the capturing of the audio, etc.

In one example implementation, interface 500 may include a field that allows the user to specify that, if possible, a video is to be captured. But, in the event that the recipient's device does not have video capturing capabilities, then a picture is to be captured. In addition, the field may further allow the user to specify that if the recipient's device does not have the capability to capture a picture, then an audio reaction is to be captured. Thus, the user may specify an order of preference with respect to what type of video response is to be captured (i.e., video, picture, or audio).

Additionally, or alternatively, interface 500 may include a field that allows the user to specify a format of the video response. For example, interface 500 may include a field that allows the user to specify that the video response is to be recorded in a moving pictures experts group (MPEG) 4 file format, a high definition format, a standard definition format, etc. In one example, the email, requesting a video response, may include an instruction for the video response to be captured in the desired format. In another example, first user device 110 may convert the video, of the video response, into the desired format.

Additionally, or alternatively, interface 500 may include a field that allows the user to specify filters and/or visual effects to perform on the video response. For example, interface 500 may include a field that allows the user to specify that the video response is to be converted into black and white.

Returning to FIG. 4, process 400 may include receiving one or more parameters relating to the video response (block 430). For example, email component 310 may receive, in response to the user selecting the SAVE button in interface 500 (FIG. 5), information identifying one or more parameters relating to obtaining a video response from an email recipient.

Process 400 may further include storing information identifying the one or more parameters (block 440). For example, email component 310 may store the information identifying the one or more parameters, in a memory, such as memory 230.

Although FIG. 4 shows example blocks of process 400, in other implementations, process 400 may include fewer blocks, different blocks, differently arranged blocks, or additional blocks than those illustrated in FIG. 4. Moreover, one or more of the blocks of process 400 may be performed in parallel.

Figure 6A:
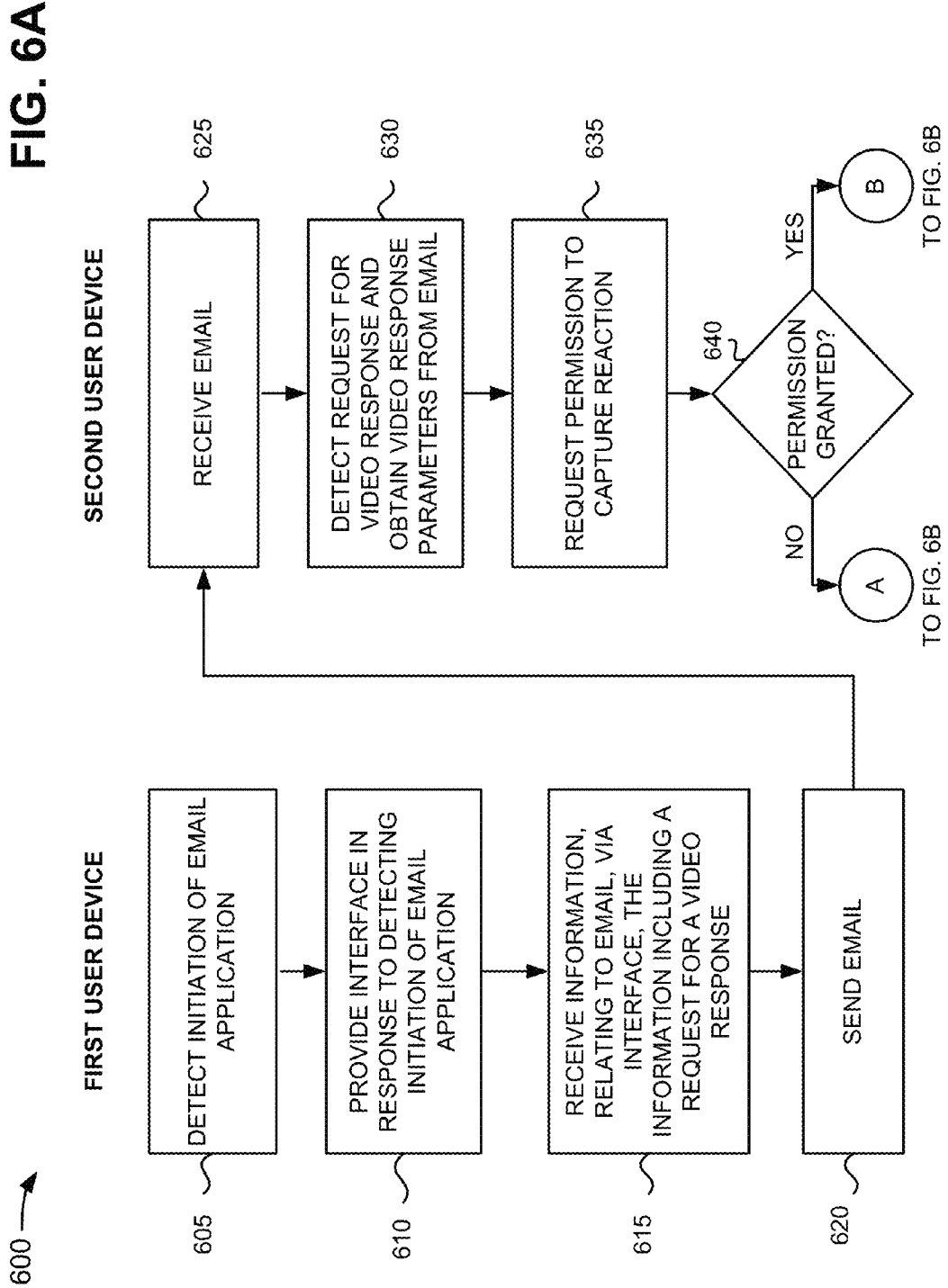
FIGS. 6A and 6B are flow charts illustrating an example process for obtaining a video response.
Figure 6B:
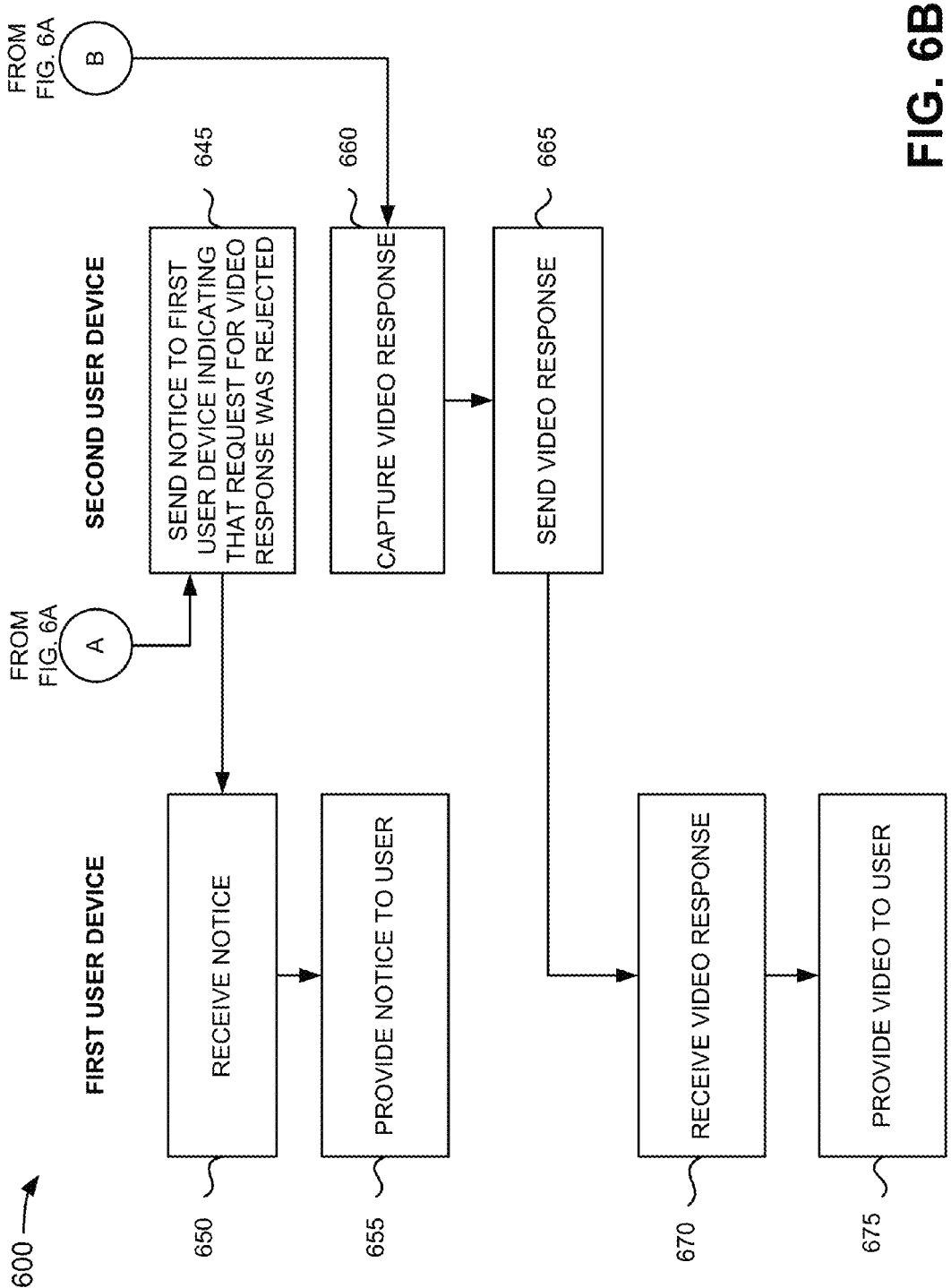

FIGS. 6A and 6B are flow charts illustrating an example process 600 for obtaining a video response. Process 600 may be performed, as shown in FIGS. 6A and 6B, by first user device 110 and second user device 120. In other implementations, some or all of process 600 may be performed by another device or a group of devices, including or excluding first user device 110 and/or second user device 120. For process 600, assume that a first user, of first user device 110, desires to send an email to a second user, of second user device 120, and that the first user desires to capture, via video, the second user's reaction to receiving the email.

Process 600 may include detecting initiation of an email application (block 605, FIG. 6A). For example, the first user, of first user device 110, may initiate an email application stored on first user device 110. First user device 110 (e.g., email component 310) may detect initiation of the email application.

Process 600 may further include providing an interface in response to detecting initiation of the email application (block 610). For example, email component 310 (of first user device 110) may, in response to detecting the initiation of the email application, cause an interface to be provided, to the first user, to allow the first user to create and send an email.

Process 600 may include receiving information relating to the email, via the interface (block 615). For example, email component 310 (of first user device 110) may receive information, from the first user and in connection with the email. The information may include email header information, such as information identifying a destination for the email (e.g., an email address associated with the second user) and a subject of the email. The information may further include text that forms a body of the email. In one example, the information may also include a request that a video response be captured in connection with the email. Additionally, the information may specify one or more parameters relating to the video response, such as one or more of the parameters discussed above with respect to FIGS. 4 and 5. The video response request and the one or more parameters may be stored, for example, in the header of the email.

Process 600 may additionally include sending the email (block 620). For example, email component 310 (of first user device 110) may detect that the first user has specified that the email is to be sent and may, in response thereto, cause the email to be sent to the destination specified by the first user.

Process 600 may further include receiving the email (block 625). For example, second user device 120 (e.g., email component 310) may receive the email sent by first user device 110.

Process 600 may include detecting a request for a video response and obtaining parameters, relating to the video response, from the email (block 630). For example, email component 310 (of second user device 120) may receive the email, from first user device 110, and may parse the header of the email to detect that a video response has been requested. Email component 310 (of second user device 120) may also obtain, from the header of the email, the parameters relating to the video response. As indicated above, the parameters may include one or more of the parameters discussed above with respect to FIGS. 4 and 5.

Process 600 may further include requesting permission to capture a reaction (block 635). For example, email component 310 (of second user device 120) may, in response to detecting the request for a video response, request permission to capture the second user's reaction to the email. In one example, email component 310 may provide a pop-up window, to the second user, that asks the second user whether a video response may be captured and gives the second user the ability to select a "yes" or "no" response. Email component 310 may request permission, from the second user, in other ways. Additionally, or alternatively, email component 310 may allow the user to modify how the user's reaction is to be captured. For example, if the first user specifies a desire to capture a video of the second user, the second user may modify this request and permit a picture or an audio recording to be captured instead.

Process 600 may additionally include determining whether permission, to capture the user's reaction to the email, has been granted (block 640). For example, email component 310 (of second user device 120) may detect whether the second user has agreed to allow a video response to be captured. As one example, email component 310 may detect whether the second user has provided a "yes" or "no" response to the pop-up window.

If the user refuses to allow a video response to be captured (block 640—NO), process 600 may include sending a notice to the user who requested the video response, indicating that the request was rejected (block 645, FIG. 6B). For example, email component 310 (of second user device 120) may generate and send a notification to the first user, indicating that the second user has not permitted a video response to be captured. The notification may be in the form of an email or another type of message.

Process 600 may further include receiving the notice (block 650) and providing the notice to the user who requested the video response (block 655). For example, email component 310 (of first user device 110) may receive the notice, from second user device 120, and cause the notice to be audibly and/or visually provided to the first user.

If the user permits a video response to be captured (block 640—YES), process 600 may include capturing a video response (block 660, FIG. 6B). For example, email component 310 (of second user device 120) may cause the email to be displayed to the second user and instruct recording component 320 to begin recording the second user, while the email is being displayed. In one example, email component 310 may initially determine whether a camera, capable of capturing video, is connected to second user device 120. If email component 310 determines that a camera is connected, email component 310 may instruct recording component 320 to turn on the camera and begin recording the second user. If email component 310 determines that a camera is not connected, email component 310 may instruct the user to connect a camera capable of capturing video. Email component 310 may then detect the connection of the camera and instruct recording component 320 to turn on the camera and begin recording the second user. In this situation, email component 320 may prevent the email from being displayed until the camera has been connected. If the video response parameters, associated with the received email, indicate that a picture and/or an audio recording are to alternatively be captured, email component 310 may perform a similar series of acts to begin capturing the picture and/or the audio recording.

Recording component 320 may capture the reaction of the second user based on the one or more parameters associated with the received email. For example, if the one or more parameters include a parameter that indicates that 30 seconds of video is to be captured, then recording component 320 may capture 30 seconds of video of the second user. As another example, if the one or more video response parameters include a parameter that indicates that the video is to be recorded in high definition, then recording component 320 may capture the video in high definition. Thus, recording component 320 (of second user device 120) may capture a video of the second user according to the video response parameters specified by the first user.

Process 600 may include sending the video response (block 665). For example, email component 310 (of second user device 120) may detect that recording component 320 has captured the video of the second user and may, in response thereto, store the captured video and send the captured video, as a video response, to first user device 110. In one example, email component 310 may send the video response as an email. Email component 310 may alternatively send the video response in other ways. Email component 310 may send the video response automatically (e.g., in response to the video being captured) or in response to an input by the second user. For example, once the video has been captured, email component 310 may allow the second user to view the video prior to the video response being sent to the first user. Upon viewing the video, the second user may decide whether or not the video response will be sent.

Process 600 may additionally include receiving the video response (block 670) and providing the video response to the user (block 680). For example, email component 310 (of first user device 110) may receive the video response and cause the video response to be provided to the first user. In one example, email component 310 may launch a video player and cause the video to be played by the video player. If the video response includes a picture, email component 310 may launch a program that allows the picture to be displayed to the first user. If the video response includes an audio file, email component 310 may launch an audio player and cause the audio file to be played by the audio player.

Figure 7A:
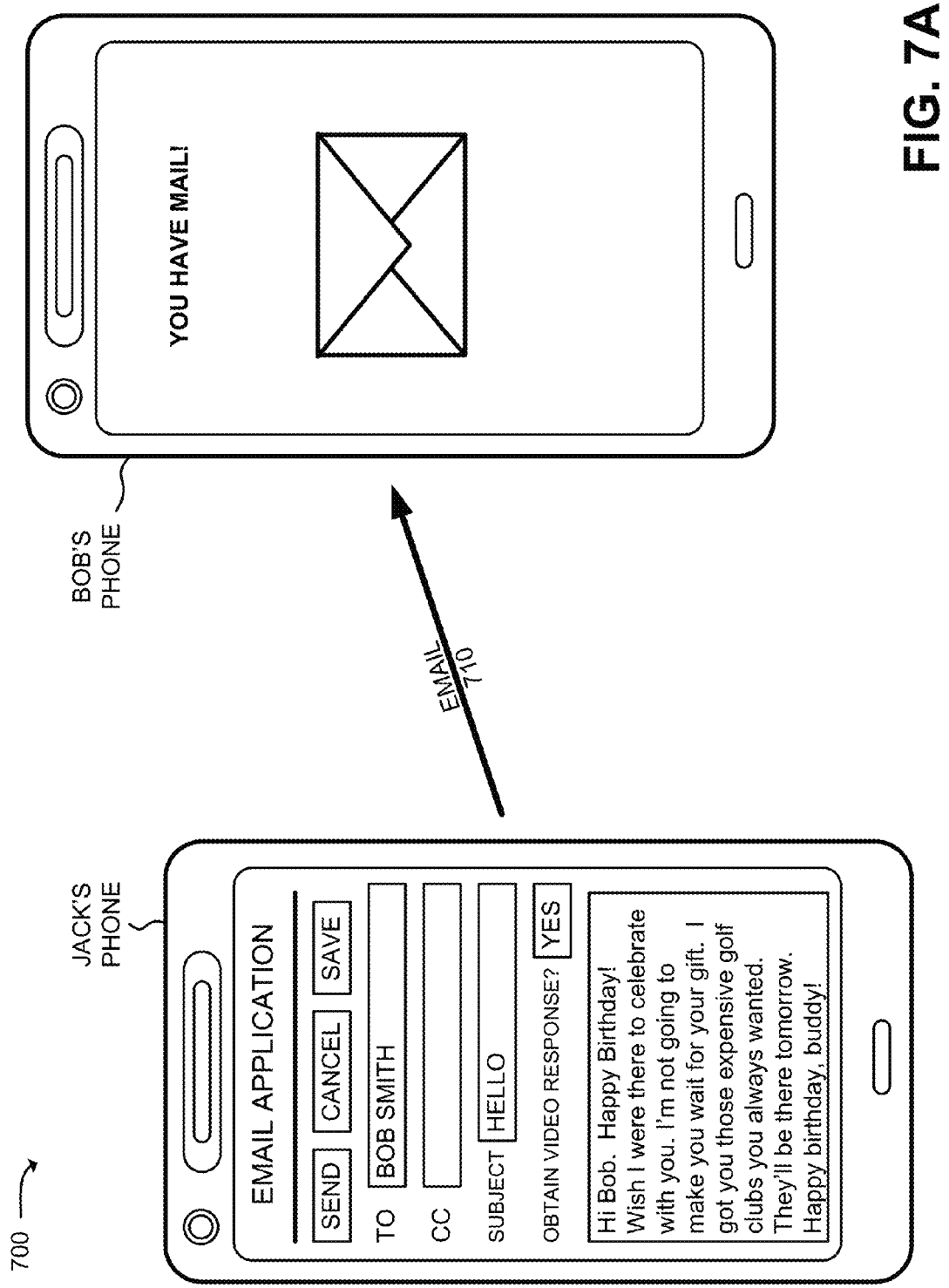
FIGS. 7A-7G are an example of the process described in connection with FIGS. 6A and 6B.

FIGS. 7A-7G provide an example 700 of process 600. In example 700, assume that a user, named Jack Torse, desires to send an email to his friend, Bob Smith, wishing Bob a happy birthday and informing Bob of the birthday gift that will be arriving the next day. Assume further that Jack wants to capture a video of Bob's reaction to his email. Thus, as shown in FIG. 7A, Jack may open an email application on his phone (e.g., first user device 110), create the email, and specify that a video response is to be obtained. Jack may then cause his phone to send the email, designated as email 710, to Bob. As further shown in FIG. 7A, Bob's phone (e.g., second user device 120) may receive email 710 and provide an indication, to Bob, that a new email has been received.

Figure 7C:
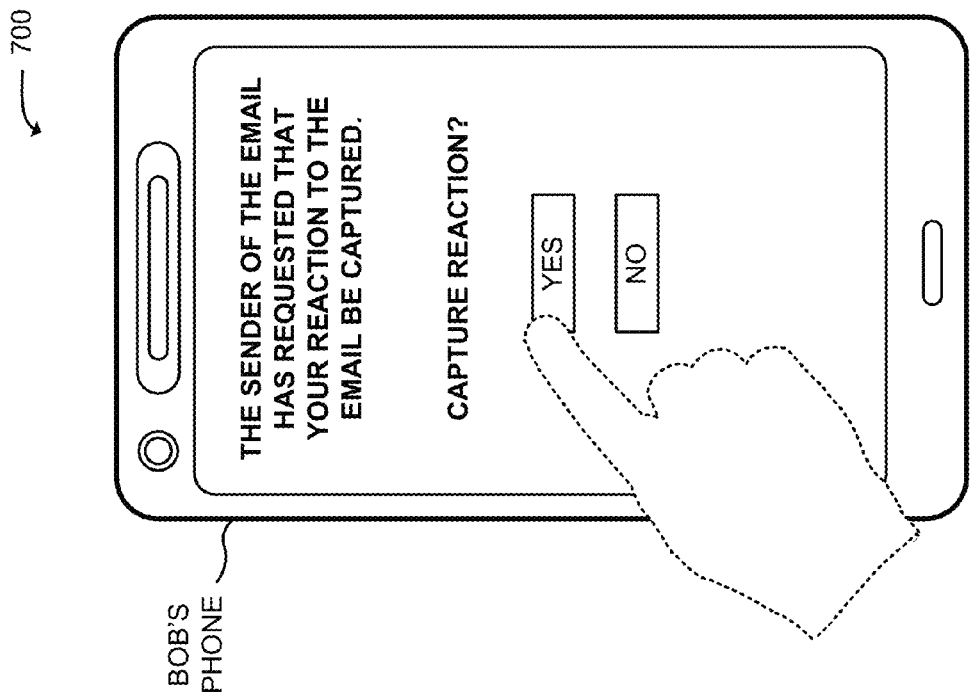
Figure 7B:
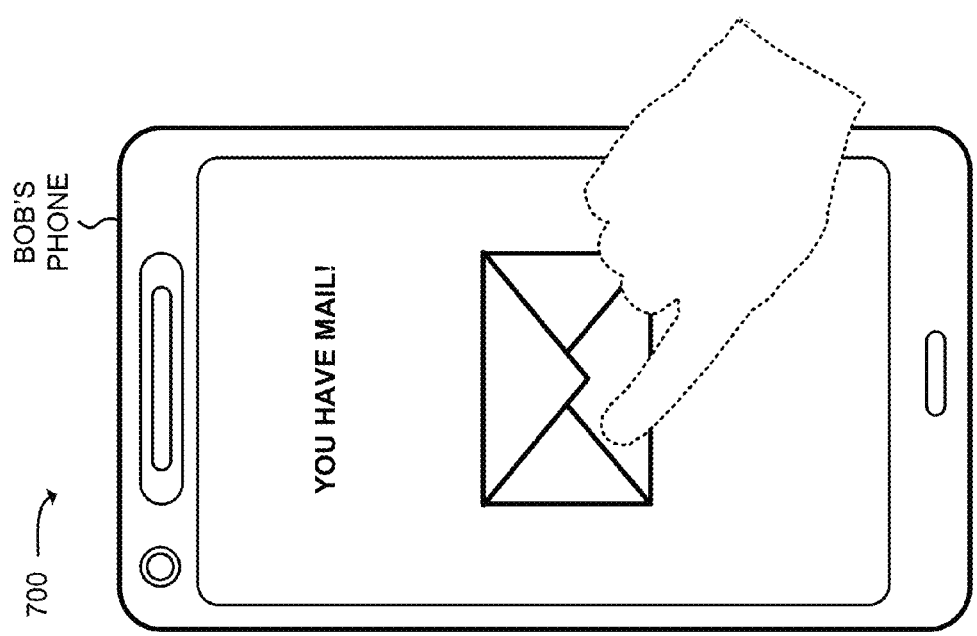
Figure 7D:
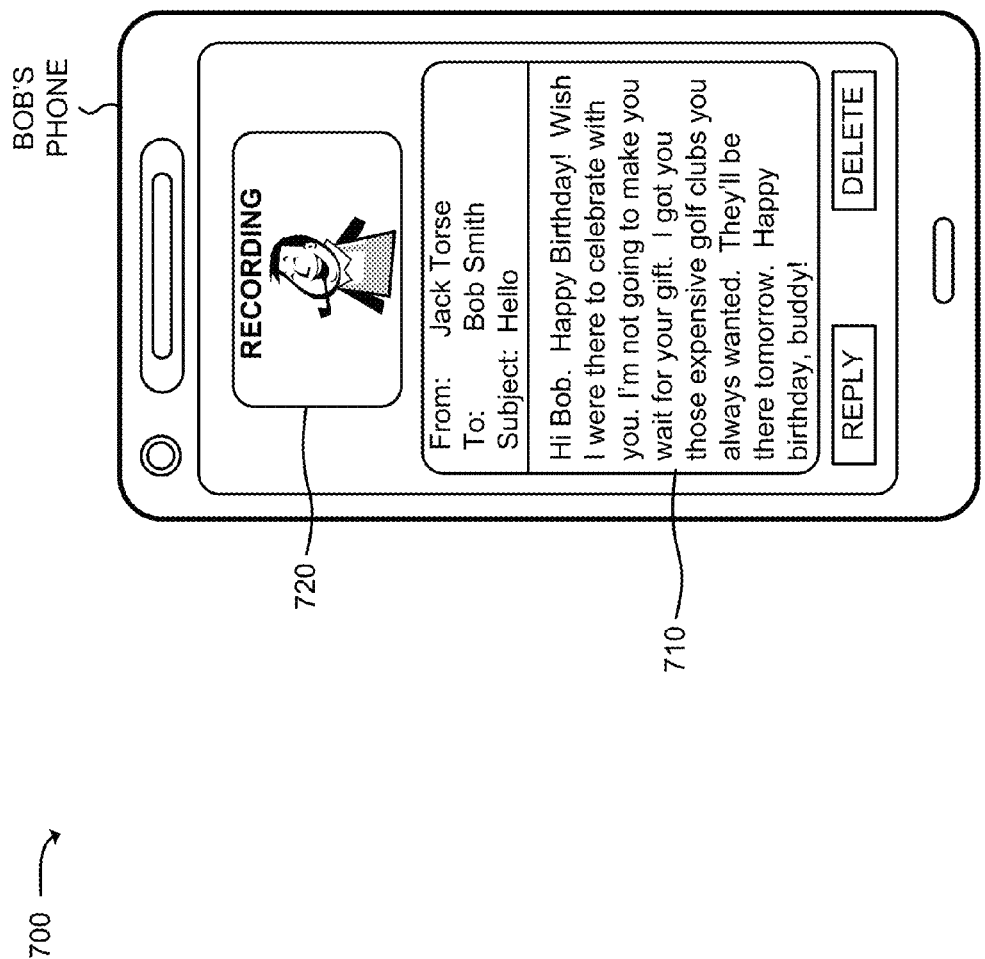

With reference to FIG. 7B, assume that Bob attempts to open email 710. Bob's phone may provide, in response to Bob's attempt to open email 710, a message indicating that the sender of the email has requested that Bob's reaction to the email be captured and giving Bob the option of permitting or denying the request, as illustrated in FIG. 7C. Assume, for example 700, that Bob permits the capturing of his reaction to the email, by selecting the YES button. Bob's phone may then display email 710 and begin recording Bob's reaction to reading email 710, as shown as video 720 in FIG. 7D. As further shown in FIG. 7D, the reaction being recorded may be displayed by Bob's phone while email 710 is also being displayed.

Figure 7E:
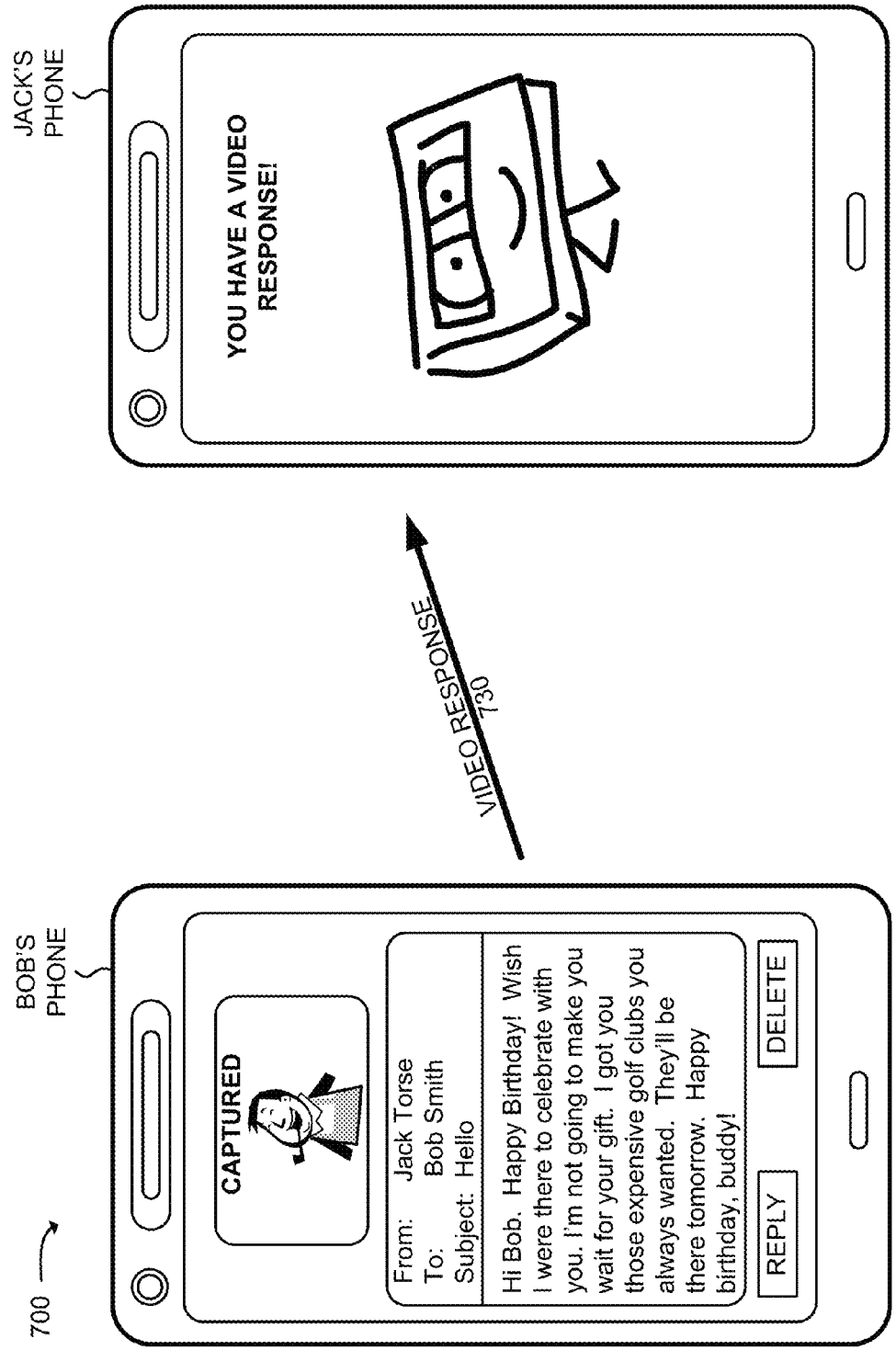
Figure 7G:
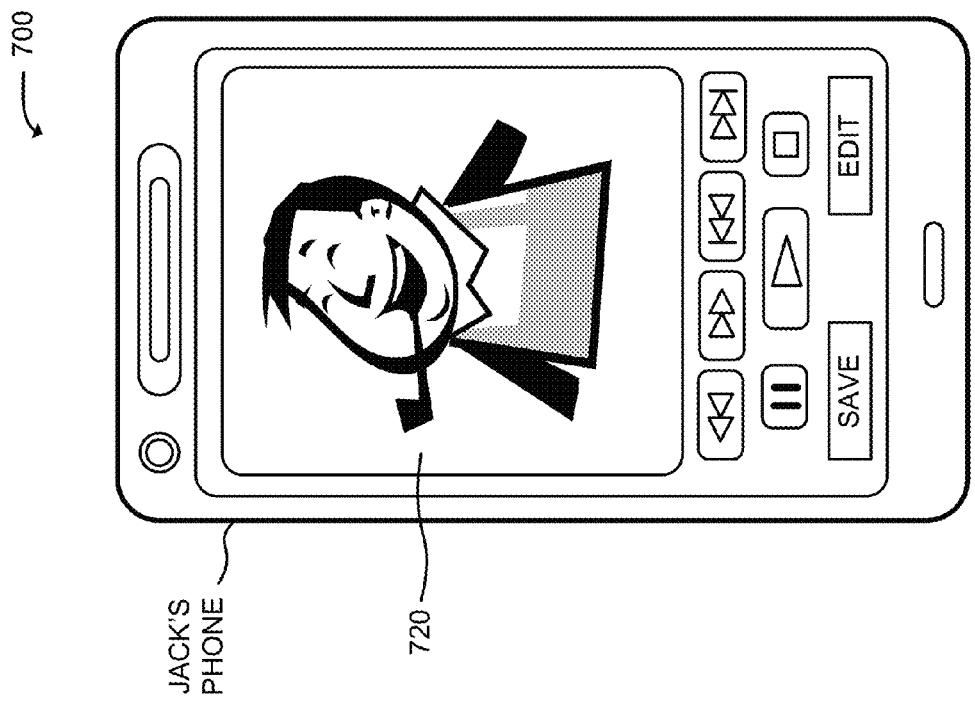
Figure 7F:
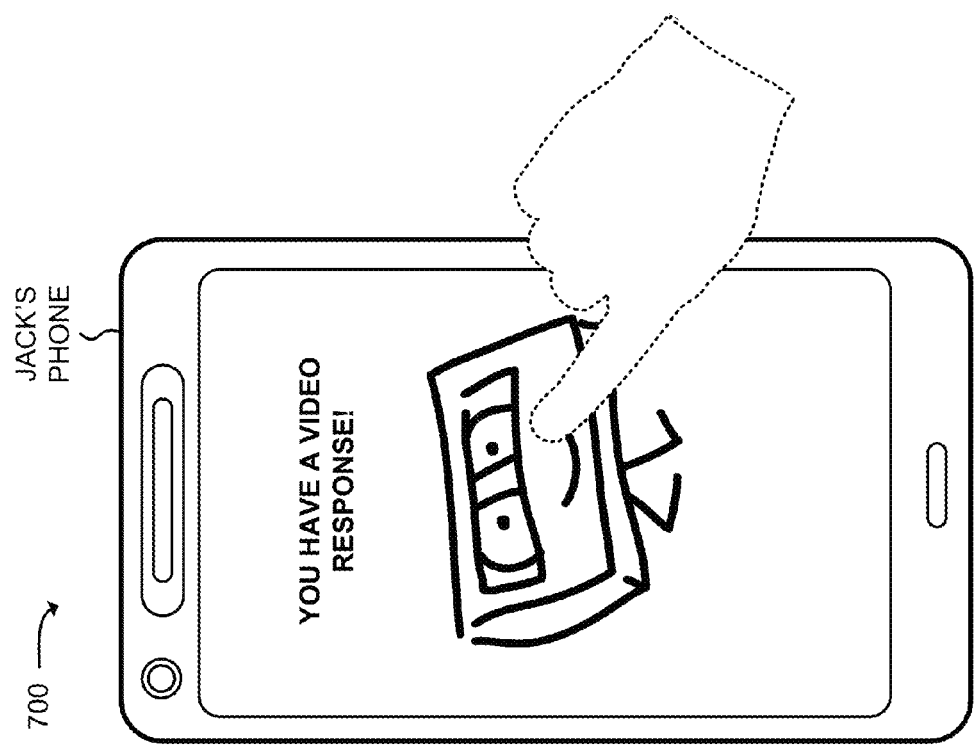

Upon capturing video 720, Bob's phone may automatically send a video response 730 to Jack's phone, as shown in FIG. 7E, which includes video 720. In response, Jack's phone may provide an indication that a video response has been received, as further shown in FIG. 7E. With reference to FIG. 7F, assume that Jack attempts to open video response 730. Jack's phone may automatically launch, in response to Jack's attempt to open video response 730, a video player application on Jack's phone and may begin playing video 720, as shown in FIG. 7G. In this way, Jack may view Bob's reaction to Jack's email.

The foregoing description of implementations provides illustration and description, but is not intended to be exhaustive or to limit the invention to the precise form disclosed. Modifications and variations are possible in light of the above teachings or may be acquired from practice of the invention. For example, while the description above focused on capturing the reaction to an email, it will be appreciated that implementations described herein are not so limited. For example, video reactions to other types of messages, such as instant messages and text messages, may alternatively be obtained.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a computer readable medium).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

It should be emphasized that the terms "comprises" and "comprising," when used in this specification, are taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a first device, an email from a second device, the email including a request for capturing a reaction of a user to viewing the email, wherein the request specifies an order of preference between a first type of recording and a second type of recording for the capturing;
   determining, by the first device and based on the order of preference, whether a first type of recording device associated with the first type of recording is connected to the first device;
   determining, responsive to a determination that the first type of recording device is not connected to the first device, whether a second type of recording device associated with the second type of recording is connected to the first device;
   displaying, by the first device, the received email responsive to a determination that the second type of recording device is connected to the first device; and
   capturing, by the second type of recording device and based on the request, a recording of the reaction of the user while the received email is being displayed.

2. The method of claim 1, wherein the received email is sent from an originating email address, the method further comprising:
   automatically sending the recording to a destination email address identified in the request.

3. The method of claim 1, further comprising:
   automatically sending the recording, to the second device, when the capturing is complete.

4. The method of claim 1, wherein the second type of recording device comprises a camera, the method further comprising:
   determining that the camera is not turned on; and
   generating an instruction that the camera is to be turned on.

5. The method of claim 1, wherein the received email includes information identifying an event, and wherein the capturing further includes:
   capturing the recording after a particular duration of time, after the email is opened, in response to detecting the event.

6. The method of claim 5, where the event includes a user action.

7. The method of claim 1, wherein the received email includes information identifying an amount of time that the capturing is to occur, and the capturing further includes:
   capturing the recording for the identified amount of time.

8. The method of claim 1, wherein the received email includes information identifying a first format of the first type of recording and a second format of the second type of recording, and the capturing further includes:
   capturing the second type of recording in the identified second format.

9. A communication device comprising:
   a memory to store instructions; and
   a processor to execute the instructions to:
   receive a message created at a user device, the message including a request to capture a reaction of a user when the message is displayed, wherein the request specifies an order of preference between a first type of recording and a second type of recording for the capturing;
   determine, based on the order of preference, whether a first type of recording device associated with the first type of recording is connected to the communication device;
   determine, responsive to a determination that the first type of recording device is not connected to the communication device, whether a second type of recording device associated with the second type of recording is connected to the communication device;
   present, responsive to a determination that the second type of recording device is connected to the communication device, a request for the user's permission to capture the reaction;
   display, based on the user's permission, the received message; and
   cause, based on the request, at least one of a video, a picture, or an audio of the user to be captured by the second type of recording device and while the received message is being displayed.

10. The communication device of claim 9, where the message includes an email sent from an originating email address, and where the request identifies a destination email address.

11. The communication device of claim 10, where the processor is further to:

detect that the at least one of the video, the picture, or the audio of the user has been captured, and automatically send the captured at least one of the video, the picture, or the audio of the user to the destination email address in response to the detection.

12. The communication device of claim 9, wherein the message includes information identifying that the video is to be captured, wherein the processor is further to:

detect the information identifying that the video is to be captured, and wherein, when causing the at least one of the video, the picture, or the audio of the user to be captured, the processor is to:

turn on a camera in response to detecting the information, and cause the video to be captured with the camera.

13. The communication device of claim 9, where the received message includes information identifying a particular duration of time and an event, and where, when causing the at least one of the video, the picture, or the audio of the user to be captured, the processor is to:

cause the at least one of the video, the picture, or the audio of the user to be captured after the particular duration of time, after the received message is opened, in response to detecting the event.

14. The communication device of claim 13, where the event includes a user action.

15. The communication device of claim 9, where the received message includes information identifying an amount of time that the capturing is to occur, and where, when causing the at least one of the video, the picture, or the audio of the user to be captured, the processor is to:

cause the at least one of the video, the picture, or the audio of the user to be captured for the amount of time.

16. The communication device of claim 9, wherein the received message includes information identifying a format of the video, and wherein, when causing the at least one of the video, the picture, or the audio of the user to be captured, the processor is to:

cause the at least one of the video, the picture, or the audio of the user to be captured in the format.

17. A non-transitory computer-readable medium for storing instructions, the instructions comprising:

one or more instructions, which, when executed by a processor of a device, cause the processor to receive a message from another device, the message including a request to capture a first type of recording of a reaction of a user of the device when the message is displayed, wherein the first type of recording comprises a video, a picture, or an audio;

one or more instructions, which, when executed cause the processor to cause the received message to be displayed;

one or more instructions, which, when executed cause the processor to cause, based on a modification of the request by the user, a second type of recording of the reaction of the user to be captured while the received message is being displayed, wherein the second type of recording comprises a different one of a video, a picture, or an audio from the first type of recording; and one or more instructions, which, when executed cause the processor to cause the captured second type of recording to automatically be sent to the other device.

18. The non-transitory computer-readable medium of claim 17, wherein the message includes an email, and the request is stored in a header of the email.

19. The non-transitory computer-readable medium of claim 17, wherein the message includes one or more parameters, and the one or more instructions which cause the processor to cause the second type of recording of the reaction of the user to be captured include:

one or more instructions to cause the processor to cause the second type of recording to be captured based on the one or more parameters.

20. The non-transitory computer-readable medium of claim 19, wherein the one or more parameters include at least two of:

an amount of time that the first type of recording is to be captured, a format in which the first type of recording is to be captured, or a destination address to which the first type of recording is to automatically be sent.

* * * * *